Feb. 15, 1966    H. F. CONDON    3,235,293
GLASS PIPE COUPLING
Filed Jan. 22, 1965    5 Sheets-Sheet 1

INVENTOR.
HARRY F. CONDON
BY
W. A. Schaich &
Thomas A. Meehan
ATTORNEYS

INVENTOR.
HARRY F. CONDON
BY W. A. Schaich &
Thomas A. Meehan
ATTORNEYS

Feb. 15, 1966 H. F. CONDON 3,235,293
GLASS PIPE COUPLING

Filed Jan. 22, 1965 5 Sheets-Sheet 4

INVENTOR.
HARRY F. CONDON
BY
W. A. Schaich &
Thomas A. Meehan
ATTORNEYS

Feb. 15, 1966   H. F. CONDON   3,235,293
GLASS PIPE COUPLING

Filed Jan. 22, 1965   5 Sheets-Sheet 5

INVENTOR.
HARRY F. CONDON
BY
W. A. Schaich &
Thomas A. Meehan
ATTORNEYS

United States Patent Office 3,235,293
Patented Feb. 15, 1966

3,235,293
GLASS PIPE COUPLING
Harry F. Condon, Toledo, Ohio, assignor to Owens-Illinois Glass Company, a corporation of Ohio
Filed Jan. 22, 1965, Ser. No. 427,406
10 Claims. (Cl. 285—233)

This application is a continuation-in-part of my application Serial No. 263,598, filed March 7, 1963, and assigned to the assignee of this application, now abandoned, which, in turn, was a continuation-in-part of my application Serial No. 145,826, filed October 18, 1961, and assigned, by mesne assignments, to the assignee of this application, now abandoned.

The present invention relates to new and useful improvements in glass pipe joints, and more specifically to a pipe joint comprising a coupling device for joining glass pipe sections and fittings which eliminate leakage and corrosion of the pipe joint or coupling when used as a conduit for acids, alkalis, chemicals and other liquid or gaseous substances.

Glass is known to be a particularly useful material for use in contact with fluids due to its non-corrosive and durable character in addition to the low porosity and smoothness of its surfaces. With these properties the flow of fluids through glass pipe is not retarded or impaired by corrosive or erosive effects. Due to its transparency and corrosion resistance, glass pipe has found extensive use in chemical laboratory installations for drainline systems as well as in the food and beverage processing industriies, for example, where cleanliness of conveying lines is required.

Previously, sections of prefabricated glass pipe having specially-formed outwardly flaring flanges at each end with broad flat sealing surfaces have been utilized to form pipe lines, the flared ends facilitating interconnection of individual pipe sections as well as with similarly formed fittings. The pipe sections have been connected by disposing a suitable flat annular gasket intermediate of the glass flares and applying an axial force thereto. Flanged metal collars are placed around each flared pipe end and drawn together by bolts with the flanged collars exerting considerable force upon the glass flares which are compressed against the intermediate gasket. The pipe sections are thus drawn together endwise with sufficient force to prevent leakage around the gasket. Cushioning inserts are employed between the metallic collars and the pipe flared ends in order to connect the latter to form a rigid joint construction. The number of parts required and the time and effort necessary for erection of pipe joints employing this form of coupling are considerable.

Tightening of the bolts which connect the pair of metallic flanged collars to draw the same together occasionally results in glass breakage due to excessive and/or unbalanced forces being applied to the fares. In order to reduce breakage of costly glass pipe which is usually fabricated of tempered borosilicate glass, dimensional control with close tolerances between the exterior surfaces of the glass flare and inner surfaces of the metallic flanged collar is required. Also the cushioning insert interposed between the metallic collar and the glass flare must be properly positioned to prevent uneven circumferential loading around the glass flare. This condition may produce unbalanced stresses in the glass which can result in breakage due to vibration, thermal or physical shock, or expansion and contraction of the piping system while in service. This invention is concerned with elimination of the disadvantages inherent in the above-described pipe joint construction and to provide a novel coupling capable of joining pipe ends in an improved manner.

Accordingly, it is an object of the present invention to provide a new glass pipe joint comprising a coupling for connecting sections of glass pipe and fittings disposed in end-to-end relation so that sealing forces transmitted by the coupling are applied uniformly to the flanged pipe ends thereby preventing leakage of the contents of the pipe without breaking or cracking of its ends.

Another object of this invention is to provide a non-corrosive glass pipe joint comprising a coupling therefor having a simple and practical construction which is relatively economical to manufacture and readily adaptable to mounting and dismounting as required.

Another object of this invention is to provide a glass pipe joint comprising a coupling device having a high degree of corrosion resistance which is applicable to connecting glass pipe sections and fittings which have exteriorly-projecting flanged end contours of varying configuration.

Another object of this invention is to provide a simple durable glass pipe joint comprising a coupling comprised of a minimum of component parts having a non-corrosive V-shaped annular gasket consisting of a chemically-resistant resilient material adapted to seal thickened flanged end portions of glass pipe or fittings into a butt joint, the joint being able to withstand pressurized internal loading for prolonged periods without breakage or corrosion thereof.

A further object of the present invention is to provide a glass pipe joint comprised of a pair of glass pipe sections having similarly or dissimilarly flanged ends and an end-enclosing device adapted to seal and firmly retain the flanged ends in durable pressure-tight essentially non-corrosive relation.

A still further object of the invention is to provide a glass pipe joint comprising a coupling device for sealably connecting sections of glass pipe and fittings disposed in end-to-end relation, the coupling device being of such a design that the contents of the pipe will not leak through the joint notwithstanding a degree of axial misalignment between the joined sections that would impair the quality of the seal of prior art glass pipe joints.

The specific nature of this invention, as well as other objects and advantages thereof, will become apparent to those skilled in the art from the following detailed description taken in conjunction with the annexed sheets of drawings on which, by way of preferred example only, are illustrated the preferred embodiments of this invention.

Figure 1:
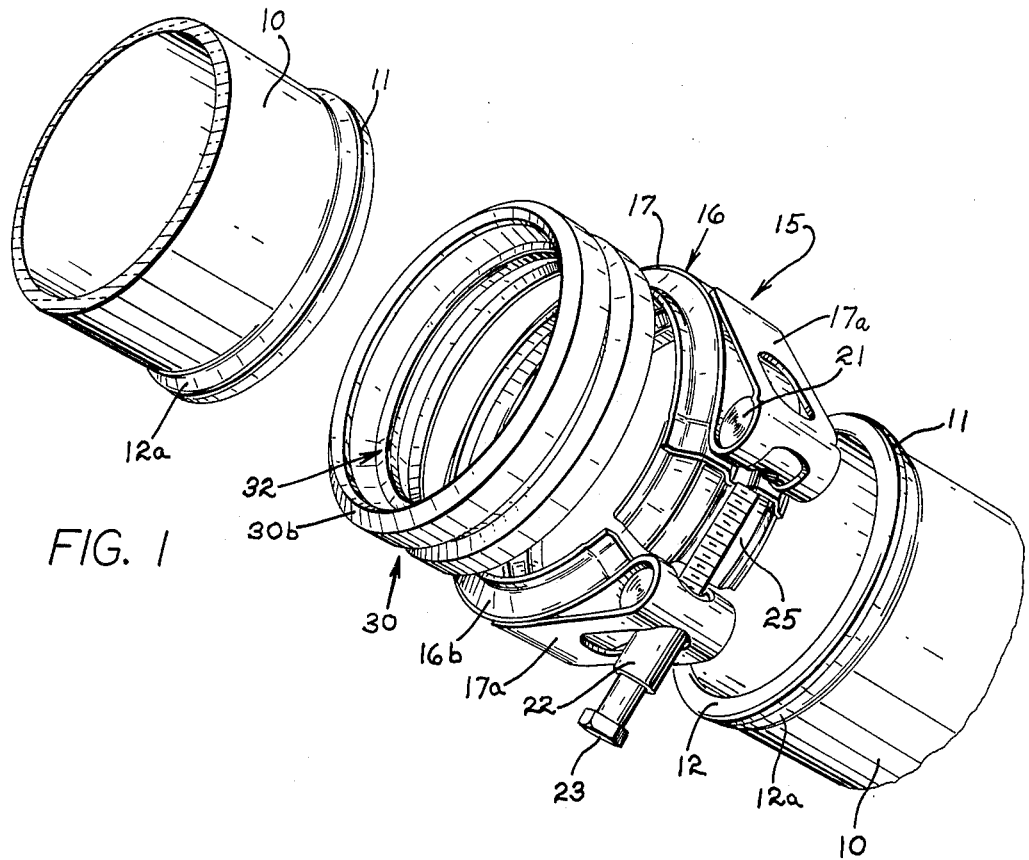
FIG. 1 is a perspective view of a pair of glass pipe end sections and the coupling device in disassembled relation.

Referring now to the drawings, the numeral 10 designates a pair of glass pipe sections, the end of each section being formed with a thickened flange 11 having the cross-sectional contour of a generally right-angled bead or rib. The internal diameter of each pipe section 10 is substantially uniform throughout its length and thickened flange 11 projects exteriorly.

Figure 5:
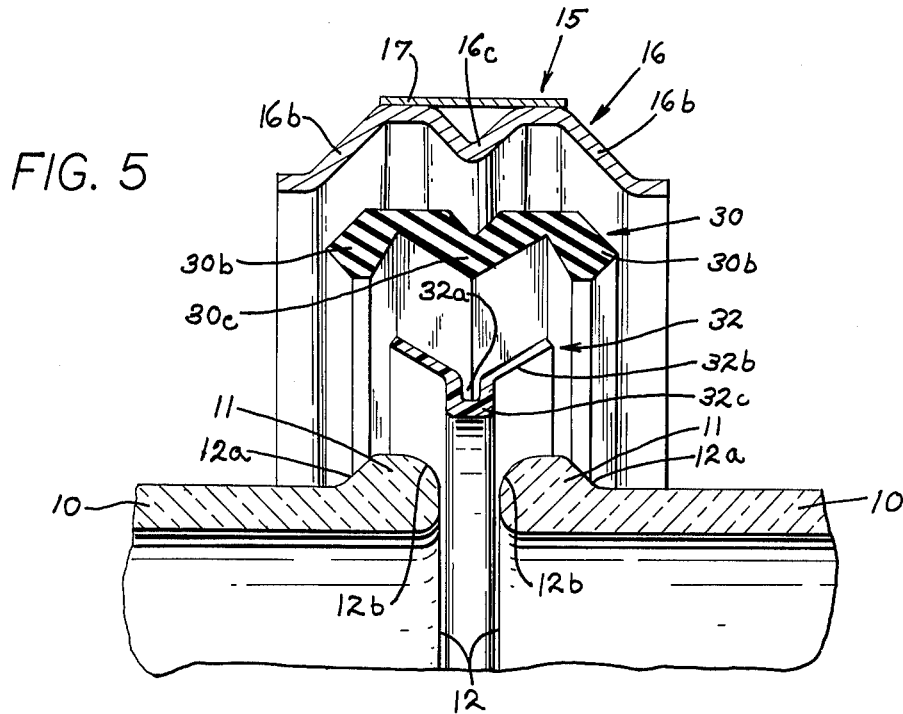
FIG. 5 is an enlarged fragmentary vertical sectional view illustrating two similarly-flanged pipe ends and the components of the coupling device in exploded relation.

As shown in FIG. 5 the flanged end of each section 10 terminates in an essentially planar end surface 12 extending normal to the axis of the pipe section. The flanged end portion has a shoulder at the junction of integral flange 11 with the shoulder surfaces 12a forming an angle of about 45° with the cylindrical exterior surface of the pipe. Flat end surface 12 at the extremity of each section may have a width slightly greater than the normal sidewall thickness of the pipe section. A convexly-curved annular sealing surface 12b interconnects transverse end face 12 and the cylindrical exterior surface of the flange.

In one embodiment of the present invention end surfaces 12 have a width about 1½ times greater than the pipe wall thickness. End surfaces 12 increase in width progressively as the wall thicknesses and diameters of larger sizes of pipe sections and complemental fittings correspondingly increase. However, the axially-extending dimension of flange 11 remains substantially uniform for a given size pipe based on wall thickness. The invention is readily applicable to glass pipe sizes ranging from 1½ to 6 inches approximate internal diameter, for example.

The essentially square-beaded contours of flanges 11 are preferably tooled on the glass pipe ends during the manufacture of pipe sections and fittings as described in my co-pending patent application, Serial No. 120,286, entitled "Method and Apparatus for Making Smooth-Surfaced Precision-End Tubular Articles," which application is assigned to the same assignee as the present application. Such contours can also be formed on the pipe and fitting ends by other apparatus and means.

Glass pipe sections 10 are preferably comprised of borosilicate glass which is tempered to permit the glass pipe to withstand considerably higher stresses. In any event the sections are fabricated from heat-resistant glass and the ends of lengthy straight sections as well as various fittings are fabricated having similarly contoured exteriorly-projecting right-cylindrical flanges which are formed in the manufacture of such articles. However, the present invention is equally applicable to joining other cross-sectional contours of flanged glass pipe ends having essentially rounded beads formed on their end portions such as during repair of such members in the field or during their initial manufacture.

Figure 2:
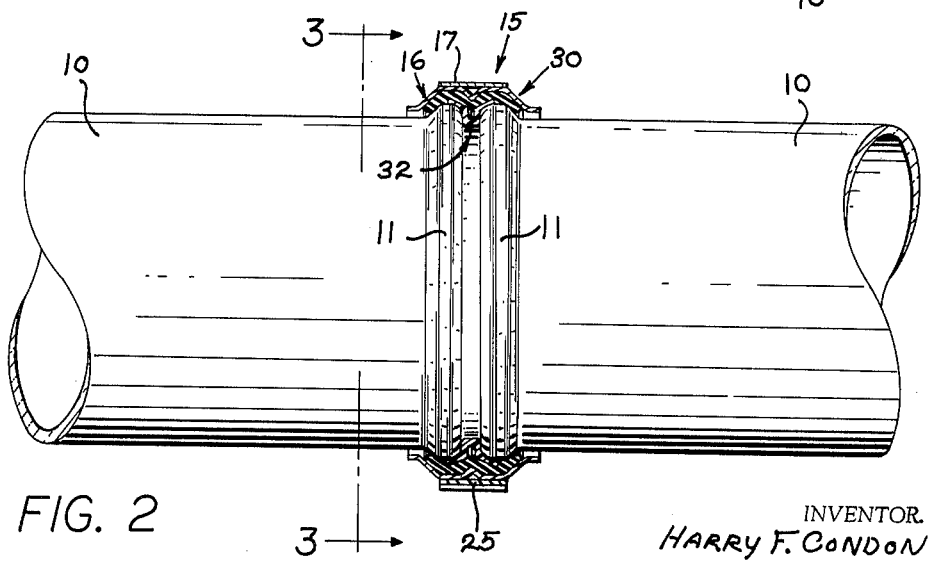
FIG. 2 is a side elevational view partially in vertical section of a sealed glass pipe joint comprising a coupling device in accordance with the present invention.

As shown in FIGS. 1 and 2 the juxtaposed flanged ends 11 of the several pipe sections are connected in end-to-end relation by means of a coupling device designated generally by the numeral 15. Coupling device 15 consists of essentially three basic elements, a segmented generally cylindrical external ring, an annular intermediate resilient member, and an annular gasket member closely fitted therewithin.

Figure 3:
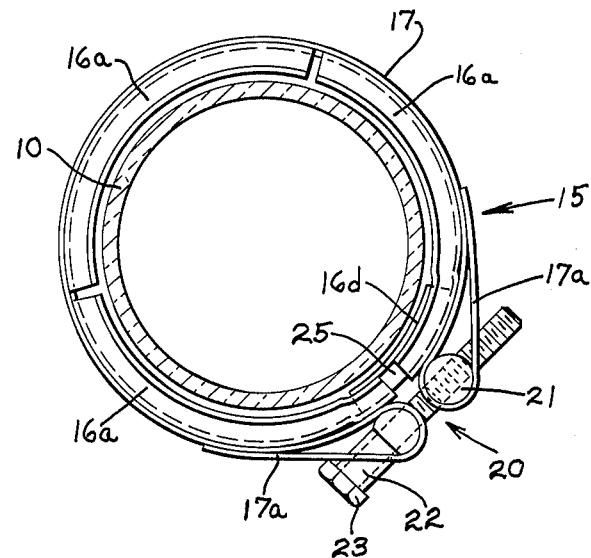
FIG. 3 is a transverse sectional view taken along the line 3—3 of FIG. 2 showing the entire coupling device in plan in finally sealed arrangement.
Figure 4:
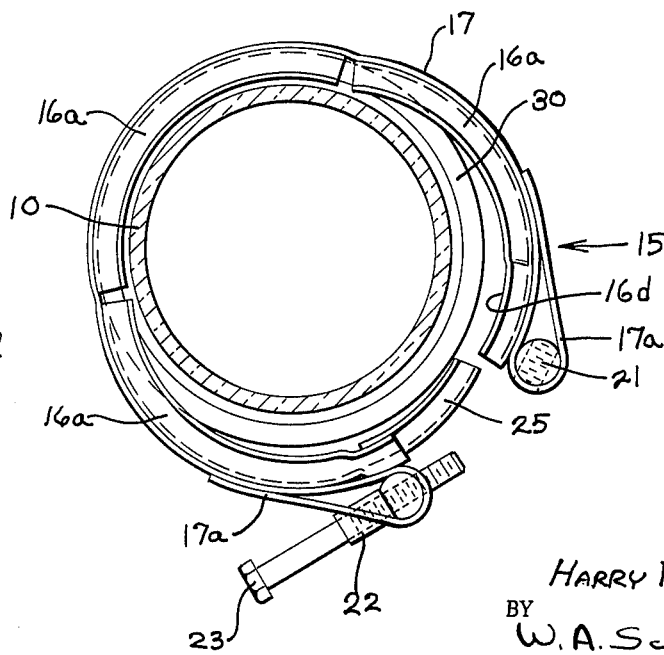
FIG. 4 is a view similar to FIG. 3 showing the coupling device in partially disengaged relation.

The segmented cylindrical external ring or body portion 16 is comprised of three individual arcuately-shaped rigid component parts 16a as shown in FIGS. 3 and 4 preferably fabricated of stainless steel or other non-corrosive material. Each of the similar component parts 16a has an arcuate extent of about 120° and a relatively shallow concavo-convex cross-sectional configuration. The lateral edges of ring member 16 terminate in a pair of inwardly and axially extending flanges 16b. Ring member 16 has an inwardly-projecting annular beaded portion 16c projecting interiorly in a central region. Thus, ring member 16 has a cross-sectional configuration which is generally M-shaped. The three component parts 16a in assembled relation conjunctively receive and surround the pair of pipe flanged ends 11 disposed in adjacent non-contacting relation. Ring member 16 has a substantially cylindrical shape between flanges 16b on opposite sides of inwardly-projecting rib or bead 16c. The short inwardly and laterally-projecting flanges 16b reside parallel to the cylindrical exterior surfaces of pipe sections 10 and, when the coupling is in finally sealed arrangement, have an inside diameter which is greater than the outside diameter of pipe section 10 and less than the outside diameter of flange 11 thereof.

A discontinuous flexible annular band 17 is disposed exteriorly of ring member 16, the band preferably being attached to each of the three component parts 16a as by spot-welding at spaced locations. The ends of flexible annular bands 17 terminate in a pair of similar looped portions 17a which are brought together into adjacent spaced-apart relation in radial alignment with adjacent ends of two arcuate ring segments 16a.

A nut and bolt assembly 20 is preferably utilized to connect the adjacent looped ends 17a of the flexible band. Assembly 20 consists of a barrel nut 21 and T-shaped trunnion 22 disposed within juxtaposed looped ends 17a. A machine bolt 23 is employed to connect looped ends 17a by passage through trunnion 22 and engagement with barrel nut 21. Bolt 23 and complemental nut 21 are utilized to draw the ends of annular band 17 together and compress the segments of cylindrical band member 16 into circular relation. Obviously other types of known retaining mechanisms such as a latch-type arrangement can be utilized to restrain the ends of band 17 to draw the arcuate segments 16a together. A quick-release hose clamp such as that disclosed in U.S. Patent No. 2,724,885 to Zartler can also be employed, for example.

A telescoping guide member 25 is mounted in fixed relation within an end of one component part 16a beneath looped end 17a projecting toward the adjacent end of the next adjacent similar part. The opposing end portions of the two arcuate parts 16a are shown as being both recessed slightly to receive guide member 25 to provide uniformly circular internal surfaces of band 16. However, it has been found that such recesses can be eliminated at an economy in manufacturing without impairing sealing quality when guide 25 is formed of relatively light gauge metal. Guide 25 has an M-shaped complemental contour to fit interiorly within the recessed end portions 16d of component parts 16a to be telescopically engaged therewithin. Guide 25 is located circumferentially in alignment and beneath the looped ends of exterior band 17 to facilitate applying and removing the coupling device and to provide uniform 360° loading on the annular sealing members disposed thereunder.

An endless intermediate resilient member 30 is mounted within segmented cylindrical band member 16. Resilient member 30 is preferably comprised of elastomeric material such as rubber having a Shore Durometer Hardness, type A Scale, ranging from about 50–100. In some instances it may be desirable to construct member 30 of a fluorocarbon elastomer such as Fluorel (3M) or Viton (Dupont) for higher temperature and corrosion resistance. Resilient member 30 has a cross-sectional configuration which is M-shaped complemental to segmented ring member 16. Member 30 has exterior surfaces which are surrounded and enclosed by the complemental interior surfaces of the three arcuate parts 16a of the ring member. Resilient member 30 has a pair of laterally extending flanges 30b which are adapted to engage shoulder surfaces 12a of pipe end flanges 11. Flanges 30b have a slightly lesser internal diameter than pipe flanges 11 requiring their outward distension when the pipe end is inserted therewithin to retain the same in firm engagement. Member 30 has a central region formed into an inwardly-projecting ribbed portion 30c which is adapted to penetrate at least partially the space between the end surfaces 12.

Figure 6:
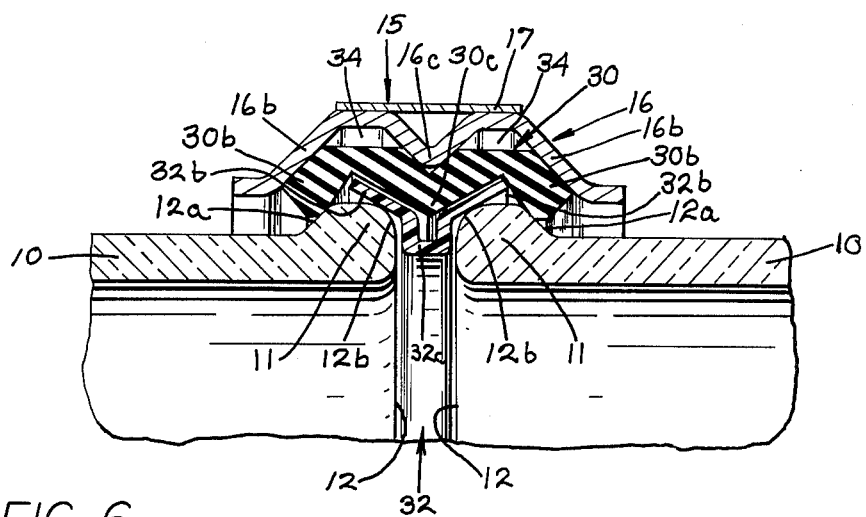
FIGS. 6 and 7 are views similar to FIG. 5 illustrating the coupling device and pipe ends in stepwise sealing arrangement.
Figure 7:
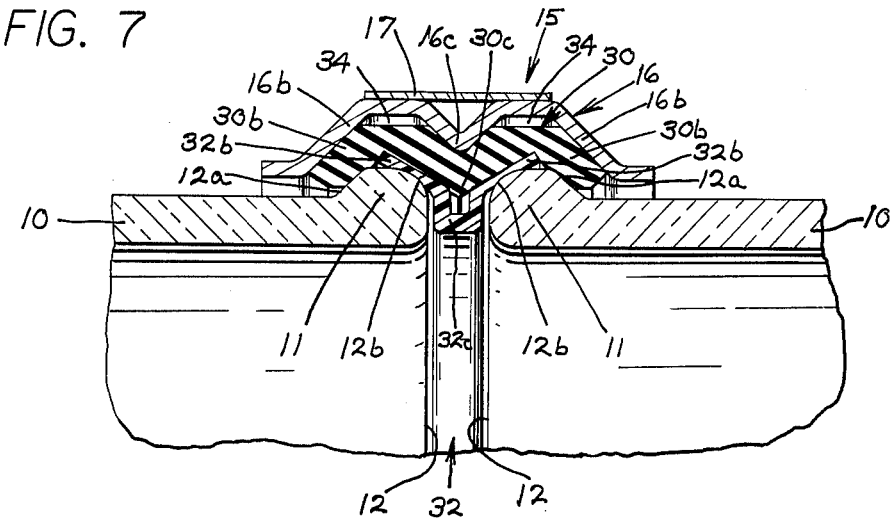

An annular gasketing member 32 comprised preferably of a chemically-resistant material having a generally V-shaped cross-sectional configuration is disposed between juxtaposed end surfaces 12 with its exterior faces directly contacting the same. Central bead portion 30c of intermediate member 30 has a tapered contour of a width substantially equal to the flaring opening provided in V-shaped gasketing member 32. When inwardly-directed radial compressive force is applied to annular resilient member 30 by surrounding segmented rigid body portion 16 upon tightening flexible band 17, central beaded portion 30c exerts a positive wedging action on the central recess 32a of V-shaped gasketing member 32. Simultaneously, flange portions 30b of resilient member 30 are drawn tightly against pipe flange shoulders 12a to firmly engage the same. With central bead portion 30c exerting a positive annular wedging action on V-shaped gasket member 32, its interior surfaces are forced apart in an axial direction. Its exterior surfaces are forced into concave configuration against convexly-curved glass sealing surfaces 12b into pressure-tight engagement therewith. The wedging action foces the leg portions of member 32 into firm engagement with any irregularities in glass sealing surfaces 12 and 12b as shown in FIGS. 6 and 7. Thus, the coupling device when tightened on the glass flanges exerts equalized and opposing axial and inwardly-directed angular forces on sealing surfaces 12b as well as on shoulder surfaces 12a of each individual flanged end. The cylindrical exterior surfaces of endless resilient member 30 do not completely fill the two annular spaces 34 within ring member 16 thereby providing cavities to accommodate the extrusion of member 30 when coupling 15 is tightened. Gasketing member 32 is retained in positively sealed engagement with sealing surfaces 12b to ensure durable pressure-tight sealing. High unit loading in an annular pattern is obtained by forcing an intermediate leg portion of V-shaped gasket 32 against glass surface 12b. This region is generally disposed at an angle of about 30° from the pipe axis. It has been found that the use of a V-shaped gasket with leg portions each disposed at an angle of approximately 30° with respect to the pipe axis, i.e. with an included angle of 120° between the sealing surfaces of the gasket, permits the coupling incorporating such a gasket to effectively seal pipe sections which are, or become, angularly misaligned with respect to one another to a greater degree than that degree of misalignment which impairs the sealing effectiveness of couplings not incorporating V-shaped gaskets with leg portions disposed at an angle with respect to the pipe axis, and of similar couplings incorporating V-shaped gaskets but with leg portions disposed at a greater angle with respect to the pipe axis for example, approximately 45°. Thus, in a line of couplings marketed by applicant's assignee and incorporating a V-shaped gasket with 30° legs, coupling for 1½, 2 and 3 inch pipe sections are commercially rated for 22½ p.s.i.g. test pressure at ¼ inch/foot misalignment of pipe sections and couplings for 4 and 6 inch sections are rated for 22½ p.s.i.g test pressure at ⅛ inch/foot misalignment. Such ratings are, of course, conservative in accordance with good design practice.

The base portion of V-shaped gasket 32 has a generally U-shaped cross-section between end faces 12 to permit compression thereof while maintaining a tight seal. Inner gasket 32 has an internal diameter slightly greater than that of the pipe sections to permit easy cleaning of the joints. The internal diameters are not varied greatly to avoid the formation of deep pockets or recesses which permit sedimentation in the joint. The inner surfaces of the joint are relatively smooth for uniform flow of liquids and gases with minimum turbulence. It is to be noted that the inside diameter of gasket 32 becomes slightly reduced in diameter as coupling 15 is tightened, for example, of the order of $\frac{1}{32}$ to $\frac{1}{16}$ inch.

Gasketing member 32 is preferably comprised of fluorinated ethylene-propylene or polytetrafluorethylene synthetic resin which is sold commercially by the E. I. du Pont de Nemours Co. under the trade name "Teflon," FEP and TFE fluorocarbon resins. Alternatively this member may be comprised of polytrifluorochloroethylene sold commercially by the M. W. Kellogg Co. under the trade name "Kel–F." Depending upon the particular service application of the subject coupling, the gasketing member may also be comprised of other high-melting-point resins or other organic resins such as polystyrene or polypropylene, for example. However, it has been found that polytetrahaloethylene synthetic resins which are chemically inert and resistant to the action of corrosive chemicals such as acids and alkalis are particularly advantageous for gasketing use. The fluorocarbon resins referred to as "Teflon" yield somewhat under compressive foce in accordance with a phenomenon generally called "cold flow" thereby giving a gasket constructed therefrom the ability to sealingly accommadate itself to irregularities of the sealing surface of an adjacent member. Such synthetic resins are chemically stable up to temperatures of about 550° F. and are physically stable up to approximately 300° F.

As shown in FIGS. 3 and 7 coupling device 15 is illustrated in finally sealed arrangement with nut and bolt assembly 20 providing the compressive forces necessary to retain the ends of adjoining pipe end flanges in sealed relation. FIG. 7 shows an outwardly-facing annular surface of each leg portion of gasket 32 in highly compressed relation to effect sealing of each side of the joint. Inner gasket 32 is the sealing element of the joint capable of internal pressure retention with corrosion resistance. As shown in FIG. 4 the segmented cylindrical body portion 16 is shown in slightly distended arrangement with nut and bolt mechanism 20 disconnected to permit dismounting the coupling from the glass pipe joint. In this showing annular resilient member 30 is shown in nearly the same position as when the pipe ends are sealed, this member being sufficiently resilient and having suitable dimensions to permit slipping the several flanged pipe ends therewithin against internal gasketing member 32 prior to tightening exterior bands 16 and 17.

Figure 8:
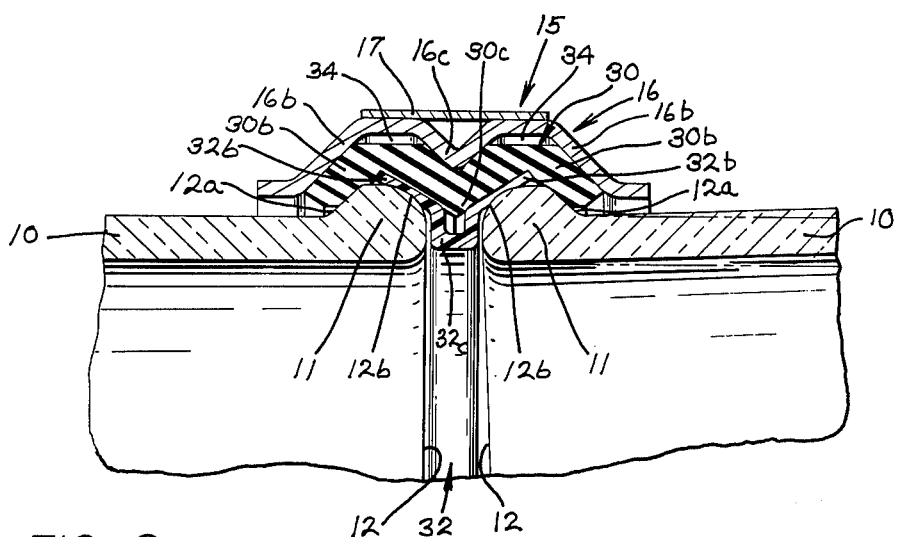
FIG. 8 is a view similar to FIGS. 6 and 7 showing the coupling device in sealed arrangement with the pipe sections angularly disposed.

An arrangement of the sealed coupling joining two pipe sections disposed in angular misalignment is shown in FIG. 8. The sections may be disposed out of axial alignment by about 1° or more with the coupling being capable of effectively sealing the joint.

Figure 9:
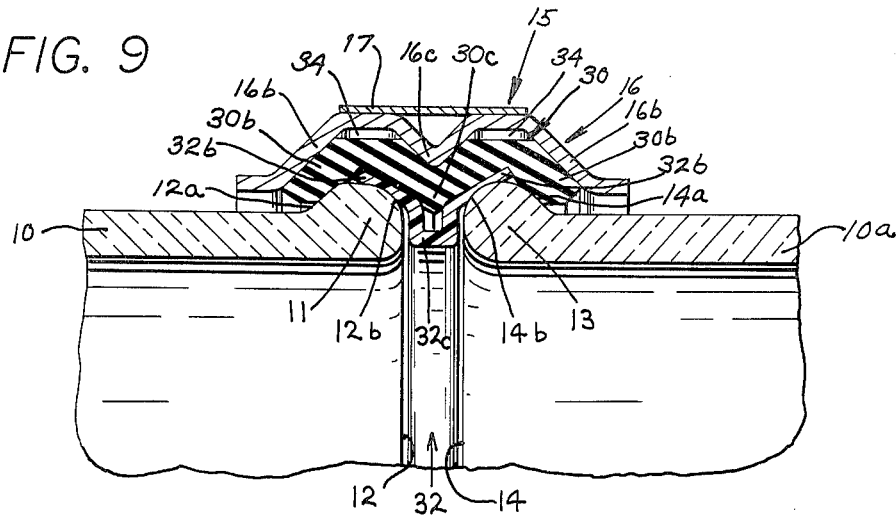
FIG. 9 is an enlarged fragmentary view of the subject coupling device connecting dissimilarly flanged ends of two glass pipe sections.

In a modified form of the invention as shown in FIG. 9, coupling device 15 is utilized to connect a pair of flanged ends having exteriorly-projecting dissimilar cross-sectional contours. As described hereinabove, flange 11 has an essentially right-angled bead or rib contour while flange 13 has a rounded contour somewhat similar to a cylindrical segment. Flange 13 is representative of an end contour which is formed by heating a square-ended glass pipe section or fitting and permitting the glass to ball-up or roll-back due to thermally-induced cohesive effects within the glass per se, without the direct application of forming tools. End surface 14 has a generally convexly-curved contour. FIG. 9 illustrates the manner in which V-shaped gasketing member 32 is wedged apart by central beaded portion 30c of resilient member 30 upon tightening segmented ring member 16 around end flanges 11 and 13. Obviously end surfaces 12 and 14 present varying exterior contours against which gasket 32 is permitted to seal. Essentially equalized sealing force is directed against flange sealing surfaces 12b and 14b of flanges 11 and 13 respectively and the sealing action is equally effective on both types of flanged contours. Thus sections 10 and 10a having different end contours are capable of being joined into a pressure-tight joint.

Figure 10:
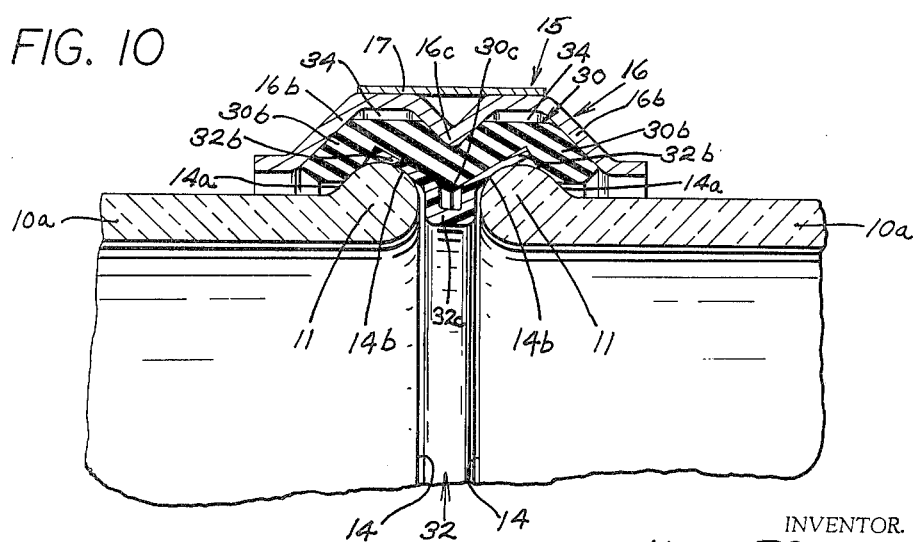
FIG. 10 is a view similar to FIG. 9 showing the coupling device in sealed arrangement connecting two similarly flanged ends having a different cross-sectional contour from that shown in FIG. 8.

As shown in FIG. 10 a pair of flanges 13 having similar round-beaded contours 14 are shown in finally sealed arrangement surrounded by coupling device 15. Inner gasketing member 32 is forcibly driven into contact with juxtaposed convexly-curved sealing surfaces 14b disposed at an angle of approximately 30° to the pipe axis as well as surface areas adjacent thereto.

Resilient intermediate member 30 have inwardly projecting flange or leg portions 30b which preferably are continuous and uninterrupted and which are adapted to surround and physically engage shoulder surfaces 12a and 14a of the pipe end flanges. In most applications it is important that the gasketing member 32 only effect sealing of the glass surface and that no sealing be provided or effected by the considerably less corrosion-resistant resilient member 30.

Assembly of the pipe ends and coupling member 15 is effected as follows:

Gasketing member 32 is fitted into resilient member 30 retained in place centrally and interlocking with central beaded portion 30c. After these members are previously assembled as an integral unit, segmented body member 16 bearing discontinuous flexible exterior band 17 in distended relation is then fitted around intermediate resilient member 30. Guide element 25 is then fitted within the recessed portion 12d of the opposing end of adjacent component part 16a of the body member. Assembly proceeds from the arrangement shown in FIG. 4 to that shown in FIG. 3. Bolt 23 is passed through trunnion 22 and engages nut 21. The flanged pipe ends are fitted thereinto in juxtaposed relation. Looped ends 17a of exterior flexible band 17 are then drawn tight around body portion 16 by tightening bolt 23. The band looped ends 17a reside over and in radial alignment with the adjacent ends of two arcuate parts 16a to ensure uniform loading upon insert member 30 upon tightening nut and bolt assembly 20. Guide member 25 aids this uniform loading. In the preassembled state members 32 and 30 are loosely retained in member 17 to allow for expansions of the lips of member 30 when the flanged ends of the pipe members are inserted thereinto. Band 17 is drawn sufficiently tight to introduce circumferential compressive stresses into the encompassed pipe end flanges with beaded portion 30c of the intermediate resilient member wedging into, but not completely filling, the open annulus of inner V-shaped gasket member 32. Thus a leak-proof and pressure-tight joint fully capable of retaining pressures up to 45 p.s.i. gauge and higher is readily obtainable. High unit loading is obtained by the radius of the glass sealing surface 12b or 14b which is contacted by the Teflon gasket straight surface. The outer surface of leg 32b of gasket 32 has a relatively large area compared with the localized sealing surface 12b and 14b therebeneath. Compressive loading applied by the wedging action of rigid inner bead member 16c on members 30 and 32 is concentrated on the inner surface of leg 32b contacting sealing surface 12b or 14b in the form of a narrow annular pattern. This pattern exists preferably at an angle of about 30 degrees from the pipe axis. Thus, a narrow annular band of high pressure contact is achieved. The joint is not a fully rigid joint but has some flexibility. It is fully capable of sealing pipe ends mounted in angular relation of the order of about 1 inch per foot for 1½ inch pipes to about ¼ inch per foot for 6 inch pipes. The ends can be sealed out of axial alignment in any direction without difficulty. The Teflon liner will cold flow to some degree providing an excellent seal with the curved glass end surfaces.

In disassembling coupling member 15, it is obvious how retention assembly 20 is loosened in the reverse manner and the arcuately-shaped component parts of ring member 16 are spread apart by loosening and distending band 17. Band 17 is made of flexible material such as stainless steel strapping which will withstand repeated bending action without being weakened or permanently deformed.

Various modifications may be resorted to within the spirit and scope of the appended claims.

I claim:

1. A glass pipe joint comprising, in combination: two glass pipe sections terminating in thickened flanged end portions disposed in adjacent noncontacting relation and each of which has a convexly-curved annular sealing surface; an annular gasket member composed of a chemically-resistant material, having a generally V-shaped cross-sectional contour disposed between the sealing edges of the juxtaposed flanged pipe ends and having sealing surfaces which are initially straight in axial section for contacting said convexly-curved sealing surfaces, the sealing surfaces of the gasket member extending from closely adjacent positions radially interiorly of and axially between the sealing surfaces of the pipe ends to positions radially and axially beyond the sealing surfaces of the pipe ends at angles each of which has substantial radial and axial components with respect to the axis of the adjacent glass pipe section; coupling means consisting of a segmented cylindrical body member and an annular resilient member, said segmented cylindrical body member and annular resilient member having generally complemental interlocking M-shaped cross-sectional contours surrounding and enclosing the flanged ends of said glass pipe sections, said annular resilient member surrounding and interlocking with said V-shaped portion; and means connected to the segmented cylindrical body member for drawing the segments thereof together to compress said resilient member and urge each of the sealing surfaces of the gasket member into contacting relation with one of the sealing surfaces of the juxtaposed flanged end portions in a narrow annular pattern of high unit loading.

2. The combination in accordance with claim 1 wherein said V-shaped annular gasket member has an essentially U-shaped base contour with a minimal diameter slightly greater than the internal diameter of said glass pipe sections.

3. The combination in accordance with claim 1, wherein said chemically-resistant material comprises a fluorocarbon resin having cold-flow properties.

4. The combination in accordance with claim 1 wherein the annular resilient member is constructed of an elastomeric material.

5. The combination in accordance with claim 4 wherein said elastomeric material is rubber.

6. The combination in accordance with claim 4 wherein said elastomeric material is a fluorocarbon elastomer.

7. The combination in accordance with claim 1 wherein the means for drawing segments of the body member together comprises a double-ended flexible clamping band disposed exteriorly of the segments and means for bringing the ends of the clamping band together, and wherein a guide element is connected to one segment of said body member and wherein the ends of the flexible clamping band are brought together exteriorly in radial alignment with said guide member, by said means for bringing the ends of the flexible clamping band together.

8. A glass pipe joint comprising, in combination: two glass pipe sections terminating in thickened flanged end portions disposed in adjacent noncontacting relation and each of which has a covexly-curved annular sealing surface; an annular gasket member composed of a chemically-resistant material, having a generally V-shaped cross-sectional contour disposed between the sealing edges of the juxtaposed flanged pipe ends and having sealing surfaces which are initially straight in axial section for contacting said convexly-curved sealing surfaces, the sealing surfaces of the gasket member extending from closely adjacent positions radially interiorly of and axially between the sealing surfaces of the pipe ends to positions radially and axially beyond the sealing surfaces of the pipe ends at angles each of which has substantial radial and axial components with respect to the axis of the adjacent glass pipe section; coupling means consisting of a segmented cylindrical body member and an annular resilient member, said segmented cylindrical body member and annular resilient member having generally complemental interlocking M-shaped cross-sectional contours surrounding and enclosing the flanged ends of said glass pipe sections, the central portion of said resilient member having a wedge-shaped beaded contour interlocking with the V-shaped exteriorly-facing opening in said gasket member and being of substantially the same width as the V-shaped exteriorly-faced opening; and means connected to the segmented cylindrical body member for drawing the segments thereof together to compress said resilient member and to urge the wedge-shaped beaded contour thereof into the V-shaped exteriorly-facing opening of the gasket to urge each of the sealing surfaces of the gasket into contacting relation with one of the sealing surfaces of the juxtaposed flanged end portions in a narrow annular pattern of high unit loading.

9. A glass pipe joint comprising, in combination: two glass pipe sections terminating in thickened flange end portions disposed in adjacent non-contacting relation and each of which has a convexly-curved annular sealing surface; an annular gasket member composed of a chemically-resistant material, having a generally V-shaped cross-sectional contour disposed between sealing edges of the juxtaposed flanged pipe ends and having sealing surfaces which are initially straight in axial section for contacting said convexly-curved sealing surfaces, the sealing surfaces of each leg of the V-shaped gasket being disposed at an angle of approximately 30° with respect to the axis of the adjacent glass pipe section; coupling means consisting of a segmented cylindrical body member and an annular resilient member, said segmented cylindrical body member and annular resilient members having generally complemental interlocking M-shaped cross-sectional contours surrounding and enclosing the flanged ends of said glass pipe section, said annular resilient member surrounding and interlocking with said V-shaped portion; and means connected to the segmented cylindrical body member for drawing segments thereof together to compress said resilient member and urge each of the sealing surfaces of the gasket member into contacting relation with one of the sealing surfaces of the juxtaposed flanged end portions in a narrow annular pattern of high unit loading.

10. A glass pipe joint comprising, in combination: two glass pipe sections terminating in thickened flanged end portions disposed in adjacent non-contacting relation and each of which has a convexly-curved annular sealing surface; an annular gasket member composed of a chemically-resistant material, having a generally V-shaped cross-sectional contour disposed between sealing edges of juxtaposed flanged pipe ends and having sealing surfaces which are initially straight in axial section for contacting said convexly-curved sealing surfaces, the sealing surface of each leg of the V-shaped gasket being disposed at an angle of approximately 30° with respect to the axis of the adjacent glass pipe section; coupling means consisting of a segmented cylindrical body member and an annular resilient member, said segmented cylindrical body member and annular resilient member having generally complemental interlocking M-shaped cross-sectional contours surrounding and enclosing the flanged ends of the glass pipe sections, the central portion of said resilient member having a wedge-shaped beaded contour interlocking with the V-shaped exteriorly-facing opening in said gasket member and being of substantially the same width as the V-shaped exteriorly-facing opening; and means connected to the segmented cylindrical body member for drawing the segments thereof together to compress said resilient member and to urge the wedge-shaped beaded contour thereof into the V-shaped exteriorly-facing opening of the gasket to urge each of the sealing surfaces of the gasket into contacting relation with one of the sealing surfaces of the juxtaposed flanged end portions in a narrow annular pattern of high unit loading.

References Cited by the Examiner

UNITED STATES PATENTS

| 2,828,986 | 4/1958 | Mahoff et al. | 285—367 X |
| 3,006,663 | 10/1961 | Bowne | 285—233 |
| 3,084,959 | 4/1963 | Stanton | 285—233 |

FOREIGN PATENTS

| 1,037,219 | 8/1958 | Germany. |
| 16,323 | 1884 | Great Britain. |
| 549,183 | 10/1942 | Great Britain. |
| 735,271 | 8/1955 | Great Britain. |
| 913,904 | 12/1962 | Great Britain. |

CARL W. TOMLIN, *Primary Examiner.*